(12) United States Patent
Dahlhaug

(10) Patent No.: US 8,657,559 B2
(45) Date of Patent: Feb. 25, 2014

(54) METHOD AND DEVICE FOR REDUCTION OF WEAR IN A WATER TURBINE

(75) Inventor: Ole Gunnar Dahlhaug, Trondheim (NO)

(73) Assignee: Dynavec AS (NO)

( * ) Notice: Subject to any disclaimer, the term of this patent is extended or adjusted under 35 U.S.C. 154(b) by 762 days.

(21) Appl. No.: 12/933,294

(22) PCT Filed: Mar. 20, 2009

(86) PCT No.: PCT/NO2009/000106
§ 371 (c)(1),
(2), (4) Date: Sep. 24, 2010

(87) PCT Pub. No.: WO2009/120088
PCT Pub. Date: Oct. 1, 2009

(65) Prior Publication Data
US 2011/0014049 A1    Jan. 20, 2011

(30) Foreign Application Priority Data
Mar. 27, 2008    (NO) .................................... 20081514

(51) Int. Cl.
*F03B 3/14* (2006.01)
*F03B 11/08* (2006.01)

(52) U.S. Cl.
USPC ......... 415/1; 415/112; 415/121.2; 415/172.1; 415/176

(58) Field of Classification Search
USPC ........ 415/110, 111, 112, 121.1, 121.2, 170.1, 415/172.1, 175, 176, 186, 1
See application file for complete search history.

(56) References Cited

U.S. PATENT DOCUMENTS

| | | | | |
|---|---|---|---|---|
| 1,942,995 A | * | 1/1934 | Biggs | 415/115 |
| 2,054,142 A | | 9/1936 | Sharp | |
| 3,398,696 A | * | 8/1968 | Sproule | 415/109 |
| 4,468,167 A | * | 8/1984 | Ogiwara et al. | 415/1 |
| 5,944,483 A | * | 8/1999 | Beck et al. | 415/117 |

FOREIGN PATENT DOCUMENTS

| | | |
|---|---|---|
| FR | 1182583 A | 6/1959 |
| JP | 63-219881 A | 9/1988 |
| JP | 8-74727 A | 3/1996 |

* cited by examiner

*Primary Examiner* — Igor Kershteyn
(74) *Attorney, Agent, or Firm* — Akerman LLP

(57) ABSTRACT

A method and device for reducing wear in a water turbine (1) comprising a turbine housing (2) and an impeller (4), and where between the turbine housing (2) and the impeller (4) is arranged a seal (16, 18), and where the method comprises supplying cleaned water to the seal (16, 18).

5 Claims, 2 Drawing Sheets

METHOD AND DEVICE FOR REDUCTION OF WEAR IN A WATER TURBINE

There is provided a method to reduce wear in a water turbine. More particularly it concerns a method to reduce wear in a water turbine where the water turbine comprises a turbine housing and an impeller, and where a seal is provided between the turbine housing and the impeller. A device for performing the method is also provided.

Turbines are exposed to wear from the water flowing through the turbine. Turbines supplied with river water are typically worn more than turbines where the water is supplied from a reservoir. The reason is that river water often contains considerable amounts of sand.

Even if the wear problems to a larger or lesser extent concerns all types of turbines, Francis turbines are the most vulnerable. The Francis turbines are often designed with fairly fine clearances in the seals between rotating and stationary components. Even a relatively small wear in the seals will cause a considerable water leakage through the seal and appurtenant reduction in efficiency.

The object of the invention is to remedy or reduce at least one of the prior art drawbacks.

The object is achieved by the features stated in the description below and in the following claims.

There is provided a method to reduce wear in a water turbine where the water turbine comprises a turbine housing and an impeller where a seal is provided between the turbine housing and the impeller, as the method is characterised in that it comprises adding cleaned water to the seal.

One aspect of the method is that it also comprises:
to provide a water cleaner;
to connect a water supply to the water cleaner; and
lead the cleaned water to the seal.

Another aspect of the method is that it further comprises:
to circulate the cleaned water through the seal.

The method is performed by means of a device characterised by that a supply pipe for cleaned water is connected to the seal.

One aspect of the device is that the supply pipe is connected to a water cleaner.

Another aspect of the device is that the inlet to the water cleaner is connected to the water supply to the turbine.

Still another aspect of the device is that a pump is provided to be able to circulate the cleaned water through the seal.

The water cleaner may preferably be constituted by a cyclone where the inlet to the cyclone is connected to the turbine inlet. The outlet from the cyclone for cleaned water may, besides the seals, also supply cleaned water to the main turbine valve, which is also exposed to wear.

The outlet from the cyclone for separated material may preferably be lead to the turbine suction pipe.

The turbine normally comprises several seals where one or more of the seals seal against relatively high pressure, while others may seal against a negative pressure.

Cleaned water is lead under sufficiently high pressure to the pressure side of the seal so that the cleaned water forces the water flowing through the turbine away from the seal. Thus is the supply of cleaned water to the seal assured.

It is suitable to collect cleaned water having flowed through the seal, and to lead the cleaned water back to the pump. In a preferred embodiment one seal is constituted by a lower labyrinth seal, and another seal is constituted by an upper labyrinth seal. The water flowing through the upper labyrinth seal may be re-circulated in its entirety, while a part of the water flowing through the lower labyrinth seal leaks into the suction pipe.

The provided method and device makes a substantial prolongation of the life of turbine seals possible, particularly where river water is used to power the turbine.

In the following is described an example of a preferred embodiment which is illustrated in the accompanying drawings, wherein.

Figure 1:
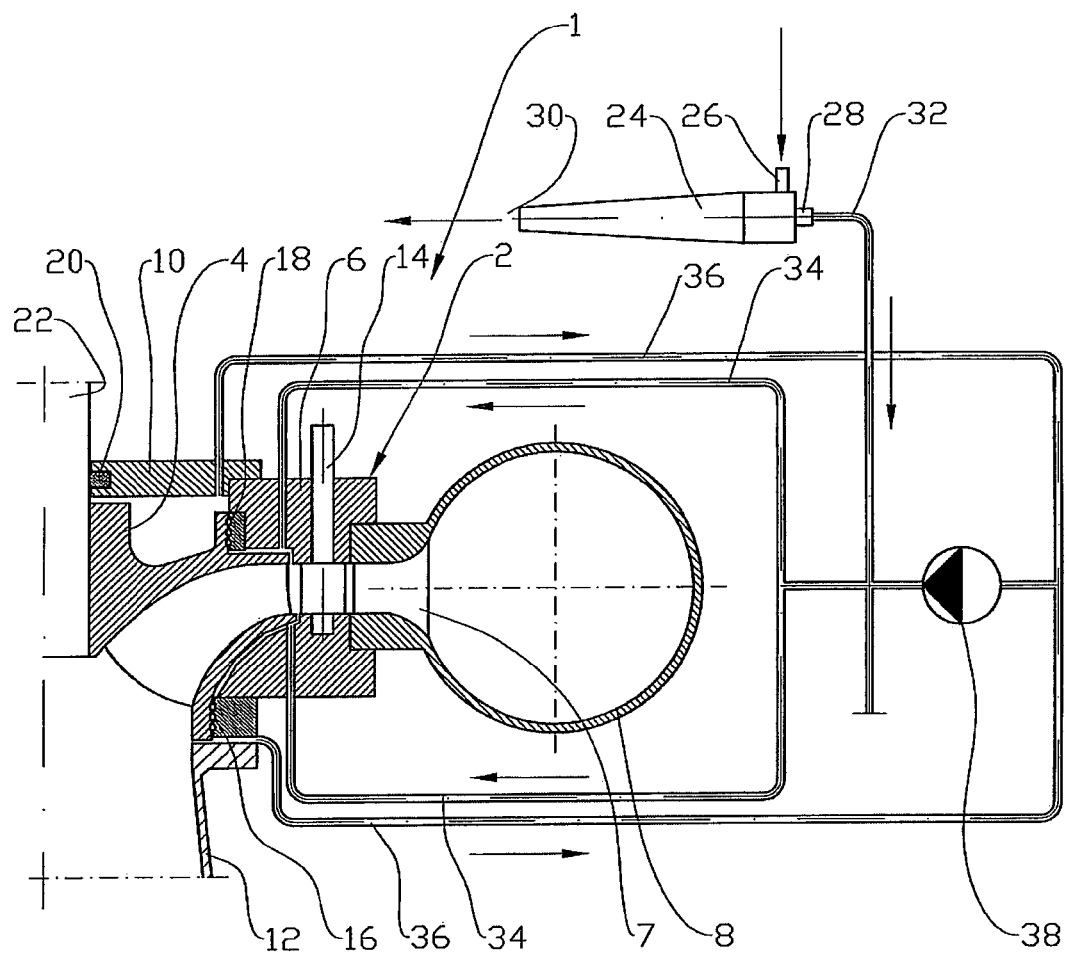
FIG. 1 shows schematically a section of a turbine with a supply of cleaned water to its seals.

In the drawings the reference numeral 1 indicates a water turbine of a per se known embodiment comprising a turbine housing 2 and an impeller 4.

The turbine housing 2 is constructed of a guide vane operating mechanism 6 surrounding an impeller 4, a stay ring 7, a spiral casing 8 which surrounds the guide vane operating mechanism 6, and a turbine cover 10.

The outlet of the turbine housing 2 is connected to a suction pipe 12. A number of guide vanes 14 are distributed within the guide vane operating mechanism 6. The actuators for the guide vanes are not shown.

Between the turbine housing 2 and the impeller 4 is provided a first seal 16, which is arranged to seal between the guide vane operating mechanism 6 and the impeller 4 near the outlet from the impeller 4.

An upper labyrinth seal 18 is provided between the guide vane operating mechanism 6 and the impeller 4 near the backside of the impeller. A shaft seal 20 is connected to the turbine cover 10 and surrounds the turbine 1 shaft 22.

The lower labyrinth seal 16 and the upper labyrinth seal 18 are constituted by so-called labyrinth seals where a certain liquid through flow is both normal and desirable due to the mode of operation of the seal.

The shaft seal 20 may according to prior art be constituted by for example a lip seal, stuffing box or other seal.

During operation water under relatively high pressure flows into the spiral casing 8 onwards via the guide vane operating mechanism 6 in to the impeller 4 where the water undergoes a considerable pressure drop, as the pressure in the suction pipe 12 may be below atmospheric pressure.

The pressure drop over the lower labyrinth seal 16 and the upper labyrinth seal 18 are approximately equal to the pressure drop in the impeller 4. Seals of this type are made with relatively small clearances to reduce the leakage between the turbine housing 2 and the impeller 4 as far as possible.

If the seals 16, 18 are exposed to sand bearing water, the wear will over time reduce the functioning of the seal, whereby the hydraulic efficiency in the turbine 1 will be reduced correspondingly.

Water is supplied to the inlet 26 of a water cleaner 24. After cleaning in the water cleaner 24 the water flows from a first outlet for cleaned water. Separated material flows from the water cleaner 24 via a second outlet 30. Arrows indicate the water flow direction.

From the first outlet 28 cleaned water flows via a first pipe 32 and a second pipe 34 to the area between the turbine housing 2 and the impeller 4 on the pressure side of the seals 16, 18.

On the opposite side of the seals 16, 18 a return pipe 36 leading the cleaned water to a pump 38 suction side is connected.

Cleaned water is thus circulated by means of the pump 38, the second pipe 34 and the return pipe 36 through the seals 16, 18.

Figure 2:
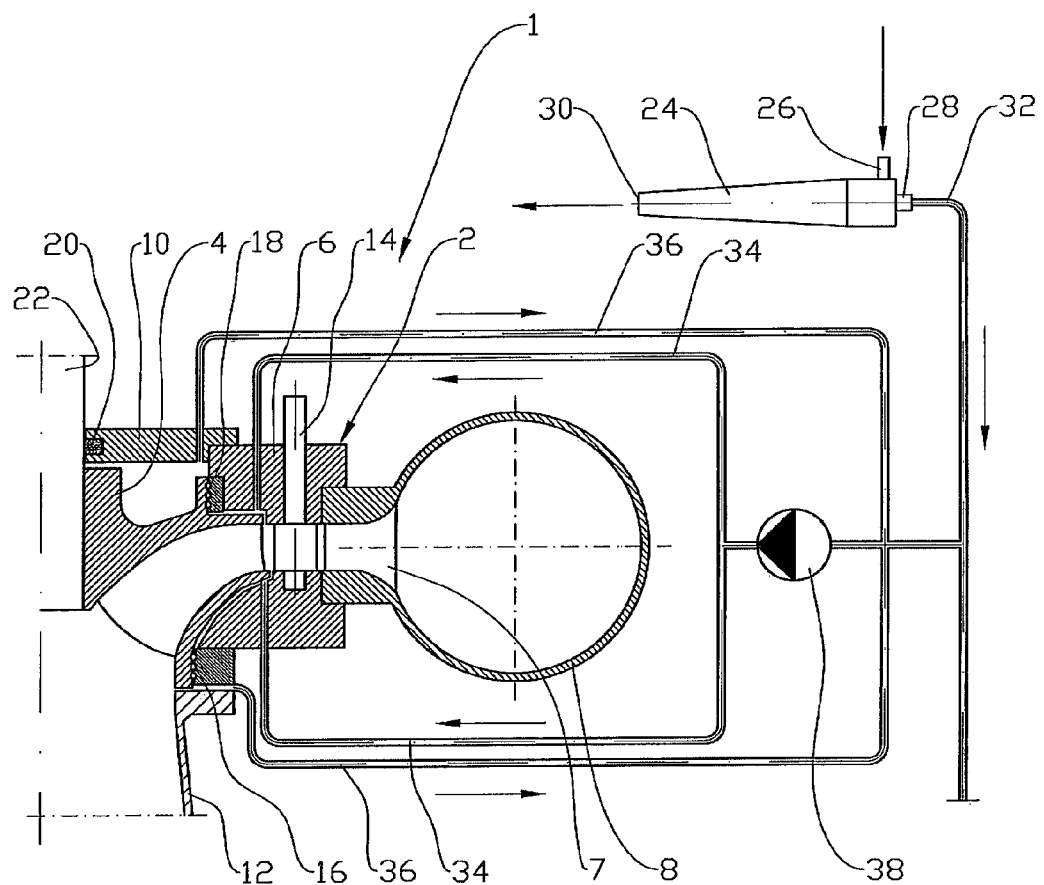
FIG. 2 shows schematically a section of a turbine with a supply of cleaned water to its seals in an alternative embodiment.

In an alternative embodiment where the output pressure from the water cleaner 24 is not sufficiently high to feed the pressure side of the seals 16, 18, the cleaned water may be lead via the first pipe 32 to the pump 38. From the pump 38 the cleaned water flows via the second pipe 34 to the area between the turbine housing 2 and the impeller 4 on the pressure side of the seals 16, 18. See FIG. 2.

The invention claimed is:

1. A method for reducing wear in a water turbine where the water turbine comprises a turbine housing and an impeller, and where between the turbine housing and the impeller is arranged a seal being supplied with water, the method comprising:
   providing a water cleaner;
   connecting a water supply to the water cleaner; and
   leading the cleaned water to the seal.

2. The method according to claim 1, wherein the method further comprises:
   circulating the cleaned water through the seal.

3. A device for reduction of wear in a water turbine where the water turbine comprises a turbine housing and an impeller, and where between the turbine housing and the impeller is arranged a seal being supplied with water via a pipe, wherein the pipe communicates with a water cleaner.

4. The device according to claim 3, wherein the inlet to the water cleaner is connected to the water supply to the turbine.

5. The device according to claim 3, wherein a pump is arranged to circulate the cleaned water through the seal.

* * * * *